Aug. 14, 1945.  A. A. SARGENT, JR  2,381,936
LOCK NUT DEVICE
Filed July 23, 1942

INVENTOR:
Albert A. Sargent, Jr.
BY Walter S. Jones ATT'Y.

Patented Aug. 14, 1945

2,381,936

UNITED STATES PATENT OFFICE 2,381,936

LOCK NUT DEVICE

Albert A. Sargent, Jr., Niagara Falls, N. Y., assignor to United-Carr Fastener Corporation, Cambridge, Mass., a corporation of Massachusetts Application July 23, 1942, Serial No. 451,992

1 Claim. (Cl. 151—7)

The present invention relates to lock nut installations of the type employing a resilient lock nut which may be of fibre or the like and aims generally to improve such installations.

Among the principal aims and objects of the invention is the provision of an improved simplified nut structure which may be formed of sheet metal to which a fibre lock nut may be attached.

Other objects and advantages will be apparent to those skilled in the art on reference to the following drawing illustrating a preferred embodiment of the invention, and in which Fig. 1 is a perspective view of my improved lock nut;

Figure 1:
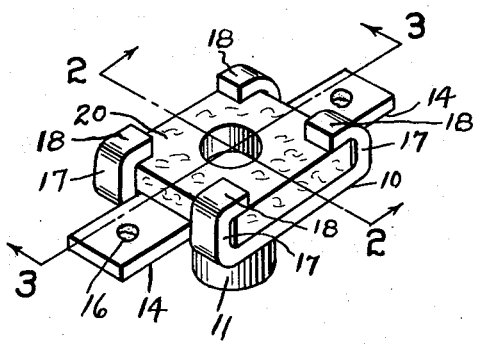
Figure 2:
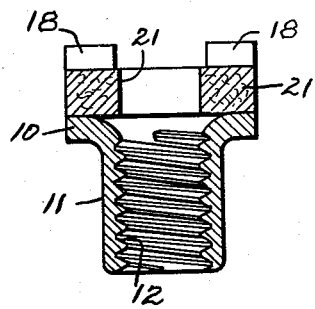
Fig. 2 is a vertical transverse sectional view taken on the line 2—2 of Fig. 1.
Figure 3:
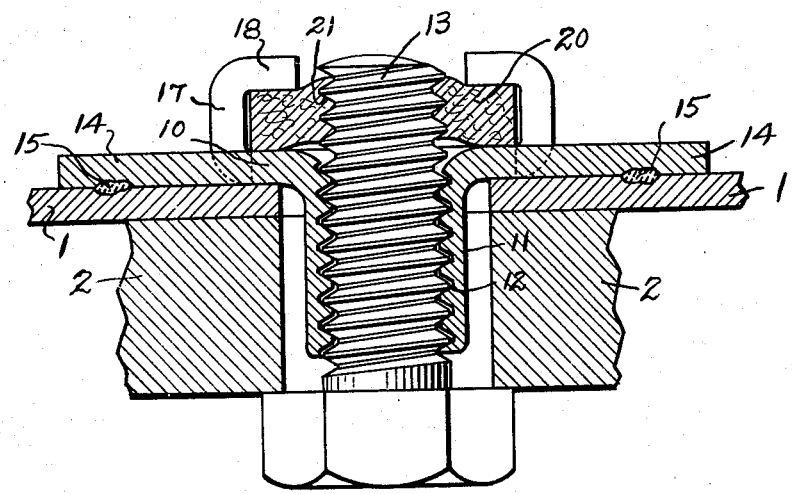
Fig. 3 is an enlarged vertical longitudinal sectional view of a typical installation as taken on the line 3—3 of Fig. 1.
Figure 4:
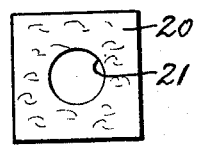
Fig. 4 is a plan view of the fibre lock washer.

Referring to the embodiment of the invention illustrated in the drawing, the nut preferably comprises a base 10 formed with a central tubular shank 11 drawn from the base and internally threaded as at 12 for cooperative threaded engagement with a screw or bolt 13. The base is preferably formed with longitudinal extensions or wings 14 for attaching the nut to a suitable support 1. If the support 1 is of metal, the nut may be permanently attached thereto as by welds 15, but if desired the wings 14 may be apertured as at 16 for the reception of a screw or suitable fastening device (not shown) for attaching the nut to the support 1, as is obvious.

A yieldable lock nut or washer 20 preferably formed of fibre is attached to the base 10 opposite the shank 11, and is formed with a threaded opening 21 of slightly less diameter than the diameter of the threaded bore 12, said opening 21 adapted to receive the threaded end of the screw or bolt 13 and offer a yieldable resistance to the passage of the screw therethrough.

The fibre lock nut or washer 20 may be retained in assembled position on said base by any suitable means, but advantageously it may be retained in a cage formed as an integral part of the base 10. One simplified way of accomplishing this is by forming legs 17 on the base bent at right angles to the plane of the base for a distance substantially equal to the thickness of the nut or washer 20, and then bent to form inwardly extending extensions 18 overlying a part of the body of the nut 20.

Figure 5:
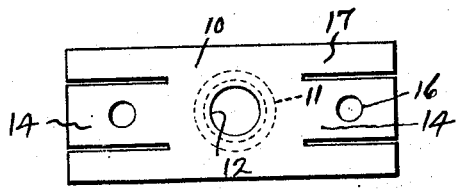
Fig. 5 is a plan view of the blank from which the nut is formed.

One economical method of forming the nut is illustrated in Fig. 5, wherein an elongated rectangular blank of metal is first formed with a central drawn shank 12. The opposite ends are then slit (Fig. 5) to form the central wings 14 and the legs 17 on opposite sides thereof. These legs are then bent at right angles to the base and away from the shank 11 to form the legs 17 and then inwardly to form extensions 18. The fibre washer or nut 20 may then be inserted in the cage formed by the legs 17 and extensions 18, and when axially aligned with the bore 12 of the shank 11, the extensions may be bent inwardly toward the base to grip and hold the washer 20 in assembled position.

The lock nut of the present invention functions in the same manner as fibre lock nuts of prior design, in that the lock washers 20 offer a yieldable resistance to the rotation of the screw therein and force the bolt rearwardly against the rear faces of the threads of the threaded nut or shank 11.

The invention further provides an improved installation in that the attaching wings may be welded or otherwise secured to an apertured support 1 with the barrel 11 positioned in the aperture of a part 2 to be supported and the two members secured together by the bolt or screw 13.

Advantages of the invention are in the simplicity of the nut construction, the adaptability of the nut to permanent installations and the replaceability of the fibre lock washer when unduly worn.

The invention is not to be restricted to the details shown and described, but includes as well equivalent constructions as defined in the appended claim.

I claim:

A lock nut comprising a base formed with a tubular threaded barrel extending from one side of the base, a non-circular yieldable lock washer assembled therewith on the opposite side of said base and in axial alignment with said barrel, portions of said base on opposite sides of said barrel being bent away from said base and then towards each other for securing said washer in fixed assembled position.

ALBERT A. SARGENT, JR.